(12) United States Patent
Taylor

(10) Patent No.: US 6,766,824 B2
(45) Date of Patent: Jul. 27, 2004

(54) FLUID CONTROL VALVE AND A FEEDBACK CONTROL SYSTEM THEREFOR

(75) Inventor: Richard K. Taylor, Fall City, WA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 39 days.

(21) Appl. No.: 10/029,348

(22) Filed: Dec. 20, 2001

(65) Prior Publication Data

US 2003/0116197 A1 Jun. 26, 2003

(51) Int. Cl.[7] .................. F16K 15/18; F16K 31/02; A61C 17/34
(52) U.S. Cl. ............ 137/522; 137/843; 137/846; 251/7; 251/65; 251/129.15; 15/167.1
(58) Field of Search .................. 137/522, 843, 137/846; 251/4, 6, 7, 8, 9, 10, 65, 129.01, 129.2, 129.21, 342, 129.15

(56) References Cited

U.S. PATENT DOCUMENTS

| | | | | |
|---|---|---|---|---|
| 247,447 A | * | 9/1881 | Kennish | 426/589 |
| 2,915,073 A | * | 12/1959 | Merritt | 137/522 |
| 3,889,675 A | * | 6/1975 | Stewart | 137/846 |
| 3,965,925 A | | 6/1976 | Gooch | 137/451 |
| 4,038,983 A | | 8/1977 | Mittleman et al. | 128/214 C |
| 4,730,635 A | | 3/1988 | Linden | 137/1 |
| 4,807,780 A | | 2/1989 | Parsons et al. | 221/113 |
| 5,078,361 A | * | 1/1992 | Nordman | 251/7 |
| 6,047,429 A | * | 4/2000 | Wu | 15/29 |
| 6,386,505 B2 | * | 5/2002 | Schob | 251/7 |

FOREIGN PATENT DOCUMENTS

GB  2233070 A  2/1991  ............ F16K/7/02

* cited by examiner

*Primary Examiner*—Ramesh Krishnamurthy
(74) *Attorney, Agent, or Firm*—Ernestine C. Bartlett

(57) ABSTRACT

The valve comprises a flexible resilient valve member which is positioned in a flexible fluid line in a fluid-tight relationship therewith. An actuating element, such as a ring-shaped member, surrounds the valve member, and an actuating coil is positioned adjacent the ring member. An electrical control signal energizes the coil in operation, producing a magnetic field which moves the actuating element to deform the valve member, opening the valve. Termination of the electrical signal permits the valve member to return to its normal closed position arrangement. A feedback control system is provided for the valve which includes providing pre-established limits on time and volume of fluid delivery. Determinations are successively made as to whether such limitations have been met, and the control valve is closed when one such limitation has been met.

14 Claims, 9 Drawing Sheets

FLUID CONTROL VALVE AND A FEEDBACK CONTROL SYSTEM THEREFOR

TECHNICAL FIELD

This invention relates generally to fluid flow valves, such as those used in fluid-dispensing toothbrushes, and more specifically concerns such a fluid flow valve which deforms under mechanical pressure to permit/block fluid flow therethrough.

BACKGROUND OF THE INVENTION

Accurate, reliable control over fluid flow in a flow line is important in a wide variety of applications. In particular applications, there are constraints on use of an electrical signal and/or particular switching devices to achieve the required fluid control. In such applications, for example, in a fluid-dispensing toothbrush in which a dentifrice fluid is moved from a reservoir in the toothbrush to a brushhead, a control valve is located at a selected point in the flow line, typically near the exit end of the flow line. The valve must reliably and safely operate in a challenging environment, i.e. the mouth. Safety issues could include contamination and/or bacteria. In such an application, it would be beneficial that any parts which touch the fluid be disposable/replaceable and low cost.

Further constraints on the fluid-dispensing application include the relatively small size of the flow line and the required simplicity of the control valve to maintain the expense of the valve at an acceptable level. Some examples of fluid control valves for various applications are shown in the following patents and publications: U.K. patent application No. 9012422.3, which teaches an elastomeric, deformable check valve having a duckbill configuration, and U.K. patent application No. 8203570, which also teaches a deformable duckbill control valve. Mechanical force in each case is used to open the valve. Other relevant patents/publications include PCT application No. PCT/US90/01246 and U.S. Pat. No. 4,498,092. However, all of these control devices suffer from complexity and expense.

Hence, it is desirable to have a fluid control valve which is simple and reliable in its operation, but also inexpensive and safe in operation.

DISCLOSURE OF THE INVENTION

A first aspect of the invention is directed to a flow valve system for use with a flow line, comprising a flexible, resilient valve member positioned in a fluid-tight relationship with a fluid line, wherein the valve member has an opening therethrough which is closed when the valve is not actuated and opens when the valve is actuated; an actuating element, positioned so that when the valve is to be opened, it moves so as to deform the valve member, such that when the valve opens, fluid moves through the valve; and means acting on the actuating member to move it to deform the valve member.

A second aspect of the invention is a feedback system for controlling a flow valve in a fluid flow line, comprising: means for determining the fluid level in an appliance; means for establishing selected criteria for fluid delivery through the valve; means for turning on the valve, permitting fluid to flow therethrough; and means for determining during operation of the system when one of the pre-established selected criteria has been met and for turning off the valve if said criteria has been met.

BEST MODE FOR CARRYING OUT THE INVENTION

Figure 1A:
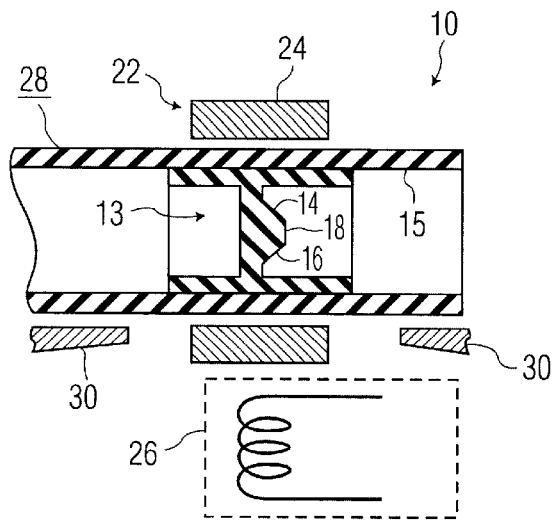
FIGS. 1A and 1B show longitudinal and lateral cross-sectional views of the flow valve of the present invention using a ring-shaped actuator.
Figure 1B:
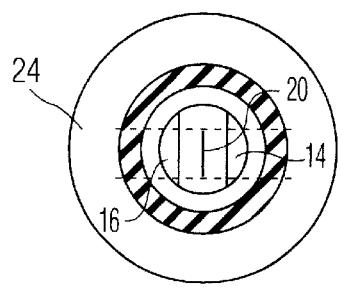

FIGS. 1A and 1B show one embodiment 10 of the flow valve/actuator combination of the present invention, including flexible flow line tube 12 with a flow valve 13 positioned therein. The presently preferred embodiment is discussed below relative to FIGS. 7A–7C. In the embodiment of FIGS. 1A and 1B, tube 12 is silicone, but it could be any flexible tubing which is capable of deforming under pressure. Tube 12 in this embodiment and the embodiments of FIGS. 3 and 8 must be capable of deforming. For the embodiments of FIGS. 7 and 9, the tube would not need to deform, but it must not prevent the valve from deforming. In FIGS. 1A and 1B, flow valve 13 could be integral with the interior portion of tube 12 or could be attached to an interior surface 15 of the tube 12 in a fluid-type arrangement.

In FIGS. 1A and 1B, flow valve 13 is a duckbill type of valve. It should be understood, however, that other valve configurations can be used, including an angular shape or other shapes. The flow valve 13 itself must be made of flexible material and must be configured so that fluid pressure in one direction keeps it closed, but so it is capable of opening in response to pressure being applied thereto which deforms the outer shape as shown by the dotted lines in FIG. 2B.

Figure 2A:
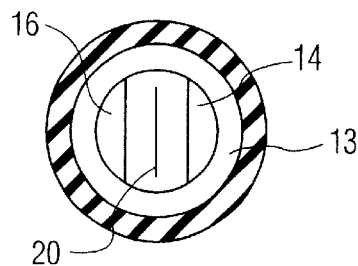
FIGS. 2A and 2B are lateral and cross-sectional views of the flow valve of FIGS. 1A and 1B in closed and open positions, respectively.

In FIG. 1, the duckbill flow valve 13 is positioned within the flow tube 12 so that it extends against the direction of fluid flow therein, as shown in FIG. 1A. The pressure of the fluid in the line pressing against the extending portion of the flow valve generally tends to maintain the flow valve in the closed position, as shown in FIG. 2A. The duckbill flow valve 13 includes two portions 14 and 16 which curve toward and join one another at the free end 18 of the value, the duckbill valve having a slit 20 (FIG. 1B) which provides an opening through the check valve where the two portions 14 and 16 meet. The slit is not visible in FIG. 1A, because of the orientation of the valve in that figure.

Figure 2B:
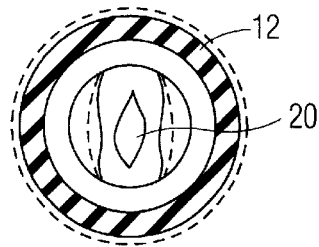

In a normal, relaxed position of the flow valve, the slit 20 is closed, preventing fluid from moving therethrough in one direction (from the reservoir, in the direction of the arrow in FIG. 1A). This allows the reservoir to be refilled by permitting fluid to flow from a refill port through the flow valve and into the reservoir without the need to open the valve with an actuator. However, when pressure is applied against the flow valve 13 in a plane which is approximately coincident with the plane of the slit opening 20, the flow valve deforms, opening slit 20 and permitting fluid to flow therethrough, as shown in FIG. 2B. Slit 20 is held open as long as the pressure is applied against the flow line in the appropriate place. The slit 20 closes back upon release of the pressure.

FIGS. 1A and 1B also show one embodiment of an actuator structure, generally designated at 22, for opening and closing the flow valve 13. Actuator 22 includes a metal ring or washer-like element 24. In the embodiment shown, ring element 24 has an inside diameter of approximately 0.5 inches, flow line 12 has an outside diameter of approximately 0.3 inches, leaving a clearance of approximately 0.2 inches. It is necessary that there be sufficient clearance between the valve body and the actuator to allow the valve body to deform when the actuator is operated. Ring element 24 has a thickness of approximately 0.1 inches. These dimensions can change in accordance with the particular embodiment.

Positioned adjacent ring element 24 is an actuator coil 26 which is responsive to an electrical control signal from a control system. In operation, an electrical signal will be applied through coil 26, which produces a magnetic field, drawing the metal ring element 24 physically toward coil 26. This results in pressure of ring element 24 against surface portion 28 of tube 12, deforming that portion of the tube structure inwardly, as well as flow valve 13. Coil 26 is arranged so that the deformation of the tube and the valve occurs in a plane which is coincident with the plane of the slit 20 in the flow valve. This results in the flow valve 13 opening, permitting fluid from the reservoir to flow therethrough.

When the desired amount of fluid has passed through the valve, the electrical control signal to the coil is terminated, which releases ring element 24 such that it moves away from the tube, permitting slit 20 in the flow valve 13 to close up and preventing further fluid transmission therethrough. In the embodiment shown, actuator 22 is supported by the valve and the flow line. The valve in turn is supported by a support structure 30, so that when the actuator moves toward the coil by magnetic force, the valve will deform properly, rather than just move with the actuator.

Figure 3A:
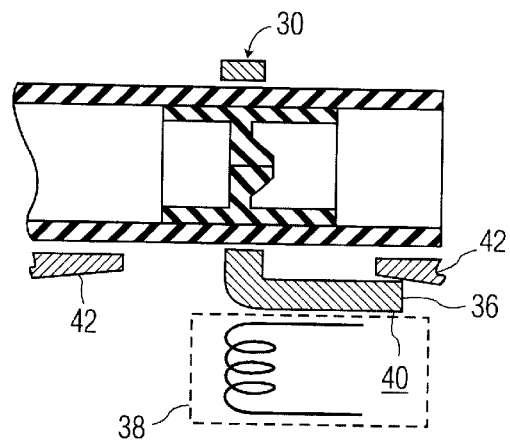
FIG. 3A is a longitudinal cross-sectional view of a flow valve with a formed metal actuator.
Figure 3B:
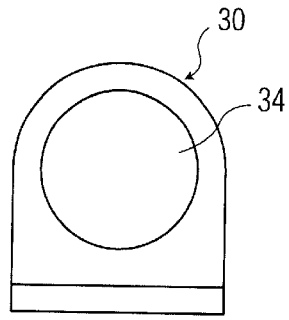
FIG. 3B is a side elevation view of the formed metal actuator of FIG. 3A.

Another embodiment of the flow valve/actuator is shown in FIGS. 3A and 3B. In this embodiment, the flow line and flow valve are the same as FIGS. 1A and 1B. The actuator 30, however, is a formed metal arrangement which includes an opening 34 through which the tube 13 with flow valve therein extends. The formed metal element 30 includes an extended base portion 36, which is approximately 0.5 inches long, 0.5 inches wide and 0.1 inches thick. Actuator coil 38 is positioned adjacent lower surface 40 of the formed metal element. The operation of this embodiment is similar to that of FIGS. 1A and 1B, in that an electrical control signal through coil 38 will result in the formed metal element 30 moving toward the coil, producing pressure on the tube and the flow valve therein, deforming the flow valve as shown in FIG. 2B, opening the slit in the flow valve, and permitting fluid to flow therethrough. The formed metal actuator 30 is free to move, with the flow valve being supported by support structure 42, as discussed above relative to the embodiment of FIG. 1.

Figure 7A:
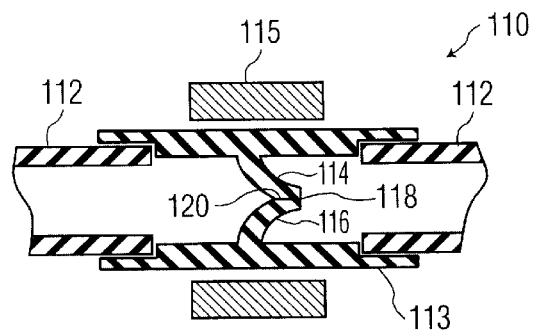
FIGS. 7A, 7B and 7C show two longitudinal views and a lateral cross-sectional view of a preferred flow value using a ring-shaped actuator.
Figure 7B:
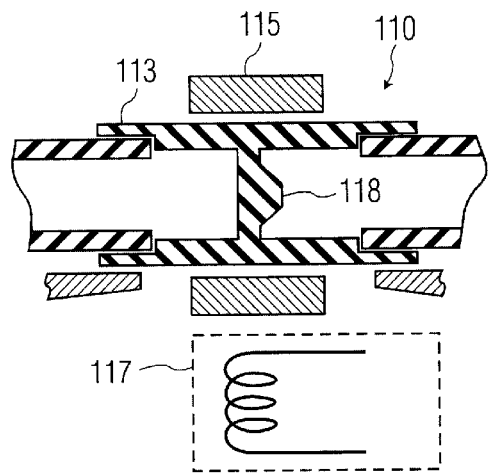
Figure 7C:
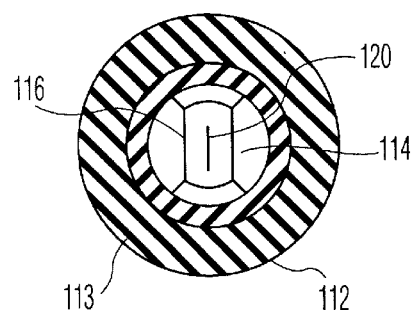

FIGS. 7A, 7B and 7C show the preferred embodiment of the flow valve/actuator combination 110 of the present invention, with flow line tube 112. Flow line tube portions are attached at each end of the flow valve 113. In FIGS. 7A, 7B and 7C, flow valve 113 is a duckbill-type valve. Other valve configurations can be used. The flow valve 113 is similar to flow valve 13 in FIGS. 1A and 1B. Accordingly, the flow valve 113 is made of flexible material and must be configured so that it is capable of opening in response to pressure being applied to the valve that deforms the outer shape, as shown in FIG. 2B. This is accomplished by ring actuator 115 and actuator coil 117 in a manner described above. The duckbill flow valve 113 is positioned so that it extends against the direction of fluid flow from the reservoir, as shown in FIG. 7A. The pressure from the fluid in the line pressing against the extending portion of the flow valve generally tends to maintain the flow valve in the closed position, as shown in FIG. 2A. Pressure from fluid going in the opposite direction, into the reservoir, will open the valve and allow the fluid to pass.

The duckbill flow valve includes two portions 114 and 116, which curve toward and join one another at the free end 118 of the valve, the duckbill valve having a slit 120 which provides an opening through the check valve where the two portions 114 and 116 meet. In a normal, relaxed position of the flow valve, the valve outer body in a plane which is approximately coincident with the plane of the slit opening 120, the flow valve tends to deform, opening slit 120 and permitting fluid to flow through the duckbill, as shown in FIG. 2B. The slit 120 is held open as long as the pressure is applied against the valve body, causing it to deform. The slit 120 closes back upon release of the pressure.

Figure 8A:
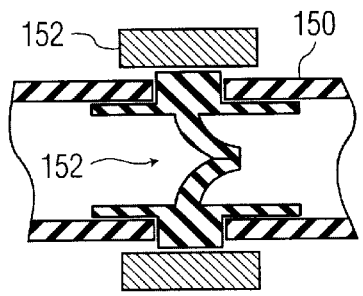
FIGS. 8A, 8B and 8C show longitudinal and lateral cross-sectional views of the flow value in an alternate configuration using a ring-shaped actuator.
Figure 8B:
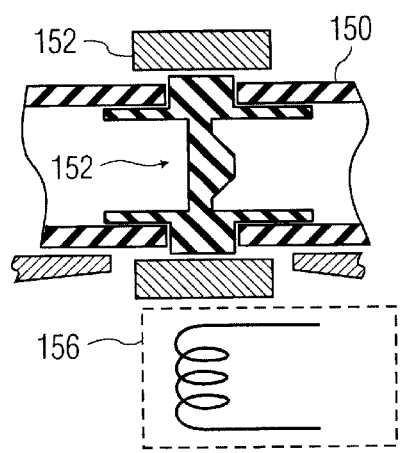
Figure 8C:
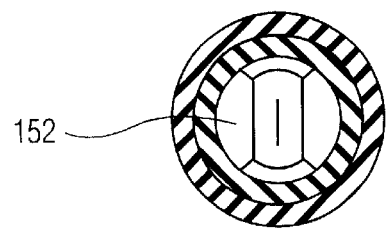

FIGS. 8A, 8B and 8C show an alternate configuration that allows the use of a larger size flow line tube 150, with a valve 152 configured as shown, an actuator 154 and an actuator coil 156. It operates similar to the preferred embodiment of FIGS. 7A–7C.

Figure 4:
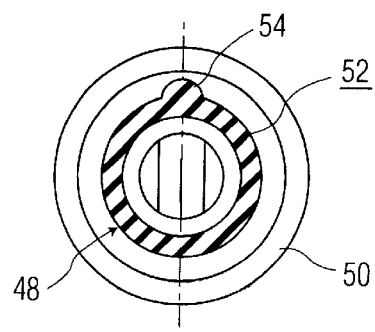
FIG. 4 is a lateral cross-sectional view of a flow valve which includes a protrusion on the flow line.

FIG. 4 shows a variation of the flow valve which is best suited for use with the embodiments of FIGS. 7 and 8. FIG. 4 shows a flow valve 48, as well as a ring actuator 50. In this arrangement, the exterior surface 52 of flow valve 46 has a protrusion or bump 54 which extends outwardly therefrom a small distance. The protrusion 54 is typically molded as part of the flow valve, but it could also be secured to the flow valve by other means. Typically, but not necessarily, it is made from the same flexible material as the flow valve. Protrusion 54 is located so that when the associated actuator ring 50 is attracted to the coil, the force on the protrusion is concentrated on a particular portion of the flow valve, thereby ensuring accurate opening of the valve. The protrusion thus helps to ensure that the force produced by the movement of the actuator is applied in the best portion to cause the slit to open.

As indicated above, the actuator portion of the system can have various configurations. The important characteristic is that the actuator movement is sufficient to deform the fluid tube and the flow valve therein sufficiently to open the fluid valve, which typically will have a slit for an opening therein. The actuator does not have to be a ring, it could be a lever or a plunger that would push on the valve body. The arrangement shown is probably the best for a power toothbrush application, due to the ability to move the actuator in response to current being applied to the coil and the ability to have the coil in the the ability to move the actuator in response to current being applied to the coil and the ability to have the coil in the handle, using magnetic coupling to move the actuator. A solenoid and plunger could be used in place of the actuator ring and coil. Energizing the solenoid would move the plunger into the valve body. A magnetic field is only one possibility for moving the actuator. Other possibilities include a motor with a cam, air pressure or fluid pressure.

Figure 9A:
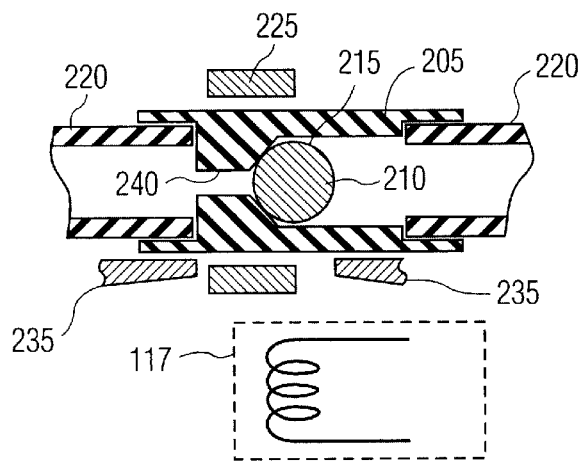
FIGS. 9A, 9B and 9C show a longitudinal and two lateral cross-sectional views of an alternate flow valve configuration that uses a ball.
Figure 9B:
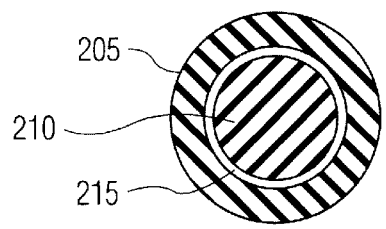
Figure 9C:
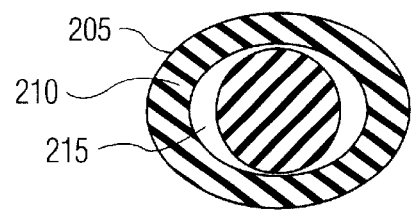

An alternate non-duckbill configuration for the flow valve is shown in FIGS. 9A, 9B and 9C. The valve assembly consists of a valve housing 205 and a ball 210. The valve housing 205 is made from a flexible material that can be deformed. The ball 210 has a ridged surface. Pressure from the fluid on the reservoir side will force the ball 210 against a tapered section 215 of the valve housing 205, causing a seal and preventing fluid from flowing through opening 240. FIGS. 9A and 9B show the valve closed, with the ball 210 centered on the tapered section 215. Applying pressure at any radial location on the outside of the valve housing 205 in the vicinity of the tapered section 215 will distort the valve housing into an oval shape, as shown in FIG. 9C. This distortion will prevent the ball 210 from completely sealing the opening 240, and will allow the fluid to flow through the valve. Pressure to the valve body could be applied in a similar manner as is used for the duckbill valve configurations. An actuator 225 is pulled into the valve housing 205 by a magnetic force from a coil 230. The valve housing 205 is compressed between the actuator 225 and the support structure 235, causing it to distort into the oval shape shown in FIG. 9C.

Fluid will always be able to freely flow in the opposite direction, into the reservoir, because the pressure from the fluid will move the ball 210 away from the tapered surface 215. The main advantage the configuration shown in FIG. 9 has over the duckbill configurations is that the location and direction of the pressure on the outside of the valve housing 205 is less critical.

Figure 10A:
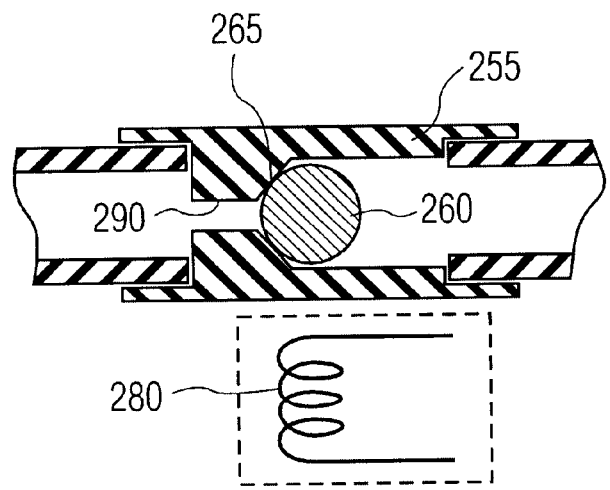
FIGS. 10A and 10B show cross-sectional views of closed and open positions of a flow valve configuration that does not need an actuator.
Figure 10B:
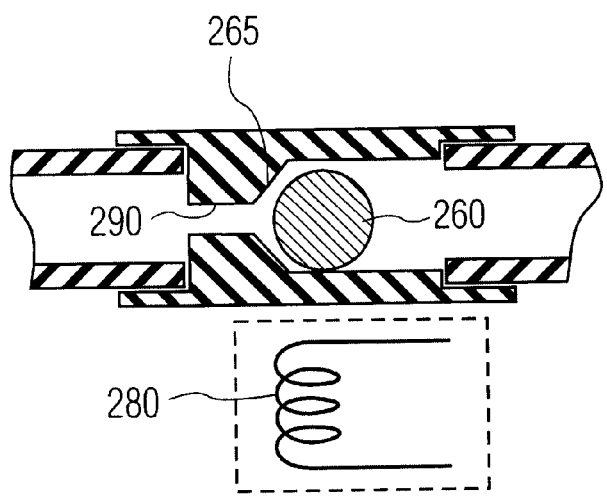

A variation on the valve shown in FIG. 9 is shown in FIGS. 10A and 10B. In this configuration, ball 260 is made from a magnetic material. Pressure from the fluid on the reservoir side will force ball 260 against a tapered section 265 of the valve housing 255, causing a seal and preventing fluid from flowing through opening 290. FIG. 10A shows the valve closed, with the ball 260 centered on the tapered section 265. A magnetic force from coil 280 will pull the ball 260 away from the center of the hole 290 and tapered section 265. This will prevent the ball from sealing the hole 240 and will allow the fluid to flow through the valve.

Figure 5:
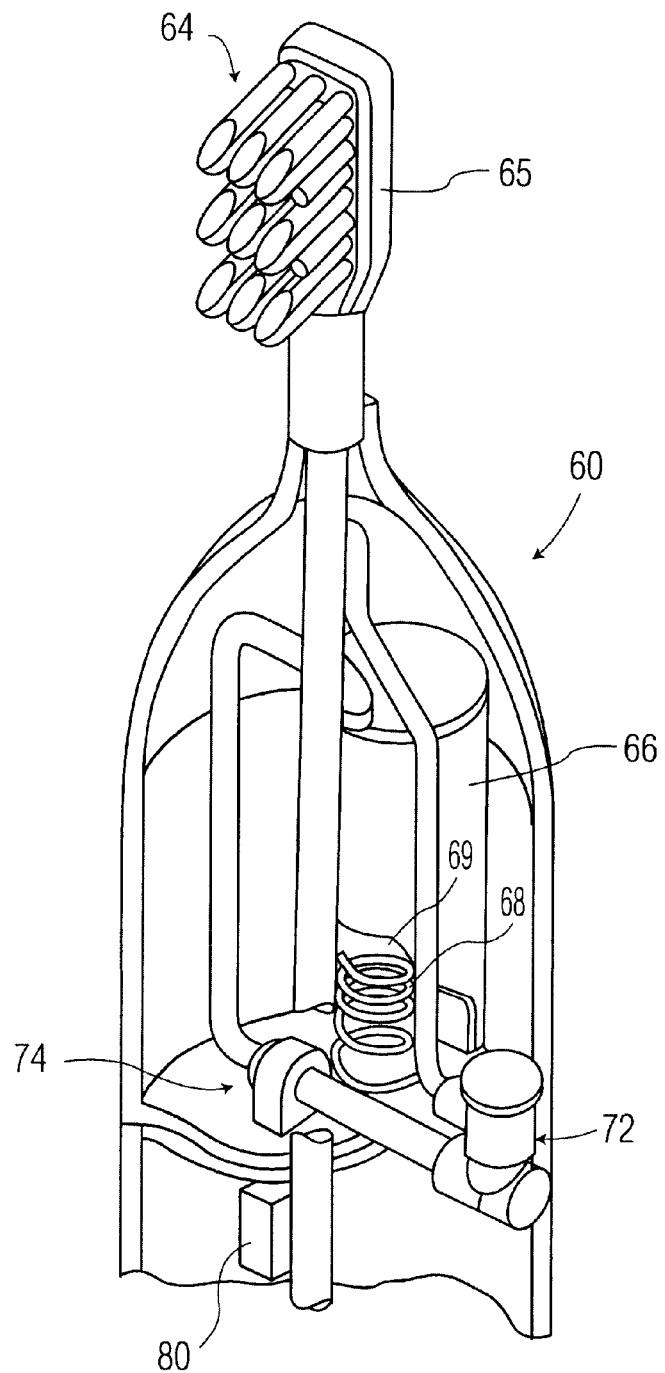
FIG. 5 is a schematic view showing a brushhead portion of a power toothbrush using the flow valve/actuator of the present invention.

FIG. 5 shows an application of the present invention in a power toothbrush. A brushhead assembly portion of a power toothbrush is shown generally at 60. It is removable from the remaining handle portion (not shown) which contains the driver portion of the toothbrush which operates on drive arm 62 in the embodiment shown. The brushhead assembly 60 includes a set of bristles 64 on a base member 65 which is mounted to drive shaft 62. A reservoir for fluid 66 is contained within the brushhead assembly. A spring 68 and plunger 69 are shown, as an example, for pushing or moving fluid from reservoir 66 to the bristle base member 65 through a flow system.

Extending from reservoir 66 is a fluid line 70. In the embodiment shown, fluid line 70 is made from a flexible, plastic material with a diameter of approximately 0.3 inches. Fluid line 70 extends through a refill fitting assembly 72 and from there extends up to the bristle base member 65. The fluid flow valve assembly of the present invention is shown at 74. Surrounding that portion of the flow line is the actuator ring portion 72 of the fluid valve assembly, which is adjacent an actuator coil 80. The coil typically will be located in the handle portion of the power toothbrush.

In operation, reservoir spring 68 displaces plunger 69, moving fluid from the reservoir 66 into flow line 70. Pressure of the fluid against the valve keeps it closed. At a selected point in time, actuator coil 80 is energized, attracting the actuator ring assembly 72, opening the flow valve in the flow line, permitting fluid to move through the flow valve and the line. When sufficient fluid has been dispersed through base member 65, the signal to the coil is terminated and the flow valve closes again.

Figure 11:
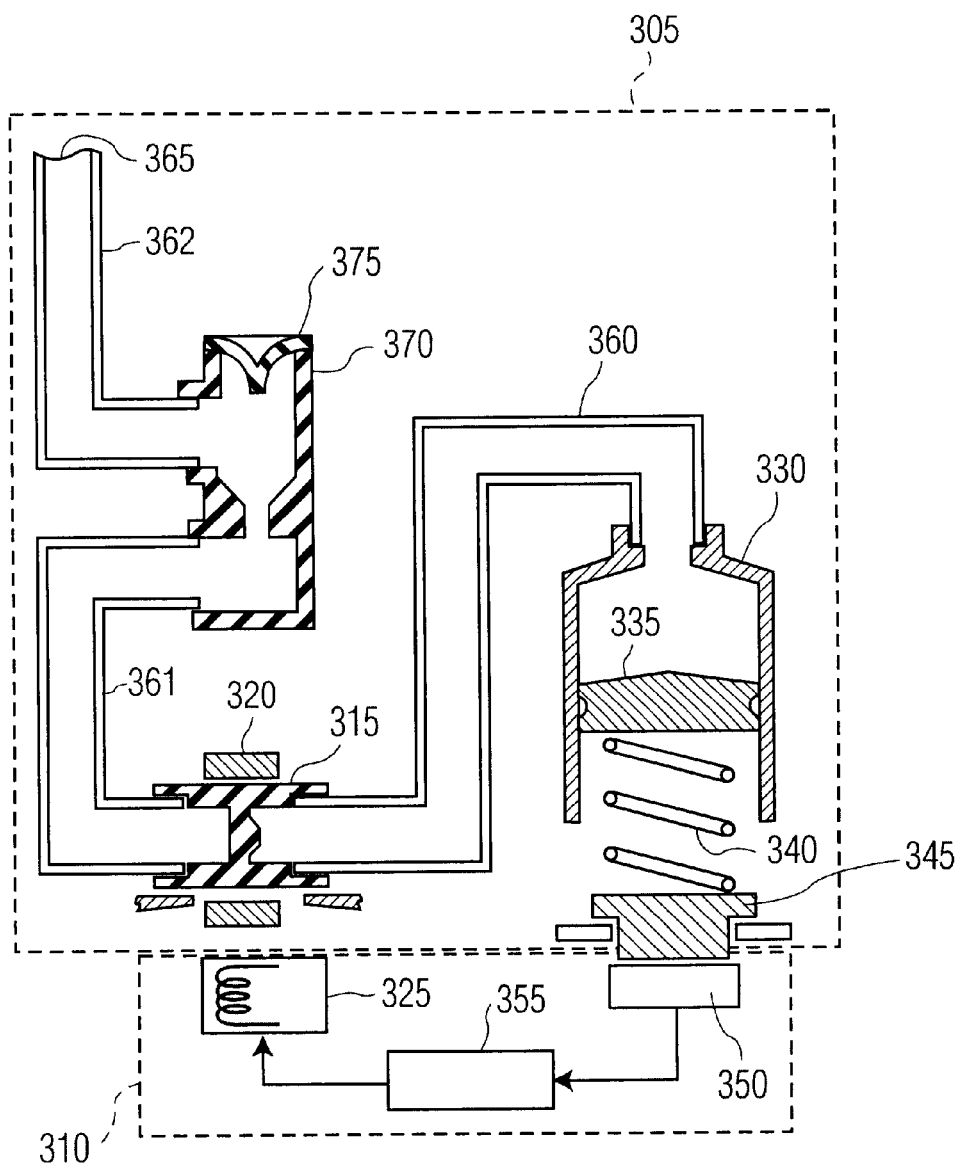
FIG. 11 shows a schematic sectional view of the fluid system of FIG. 5.

FIG. 11 shows a schematic section view of the fluid dispensing system shown in FIG. 5, with additional details. A removable/replaceable fluid carrying portion is shown generally at 305, and a permanent control portion is shown generally at 310. A duckbill flow valve is shown at 315 and an actuator at 320 with a coil at 325. A reservoir for the fluid is shown at 330. The reservoir fluid is pressurized by a plunger 335 that is acted upon by a spring 340. This pressure on the fluid keeps the duckbill valve 315 in the closed position. At the end of the spring 340 opposite the plunger 335 is a spacer 345 that transmits the force from the spring to a sensor 350 located in the control section 310. The spacer 345 also keeps the spring 340 captive when portions 305 and 310 are separated. Information from the sensor is read by a controller 345 to determine the amount of fluid that is in the reservoir 330, based on relating the force from the spring 340 to its compressed length and therefore the position of the plunger 335. The controller 355 sends a signal to the coil 325 that moves the actuator 320 and opens the flow valve 315. This allows fluid to travel through the fluid lines shown at 360, 361 and 362 and exit the system at the fluid discharge point 365.

The reservoir can be filled with fluid through the refill port 370 and fill valve 375. Fluid enters fluid line 361 and pressure opens the duckbill flow valve 315. Fluid flows through fluid line 360 into the reservoir 330, displacing plunger 335 and compressing spring 340. The fill valve 375 is a duckbill configuration, the pressure from the fluid during the discharge cycle closing this valve, keeping the fluid from leaking out the refill port.

A feedback control system can be used for operating the flow valve in the system shown in FIGS. 5 and 11. Briefly, key elements are a flow control valve which can be opened and closed with an external signal, a sensor to determine the volume of fluid in the reservoir, and a controller to read the information from the sensor and send a signal to open and close the control valve. In its simplest form, the controller would open the valve, then close the valve when the sensor shows that the reservoir is empty or when a specified change in reservoir volume has been achieved. The addition of a timing circuit to the controller allows real time monitoring and control of the flow rate of the fluid. Checking the reservoir sensor at regular time intervals would allow the controller to calculate the rate at which the fluid is being dispensed. In order to control the flow rate, the flow control valve would not be held open constantly, but would be pulsed open for short periods of time. Changing the pulse duration would allow the flow rate to be increased or decreased as needed. The control system is explained in more specific detail below relative to FIG. 6.

While the present invention has been described in the application in the context of a power toothbrush, it should be understood that other devices, particularly other devices with fluid uses similar to a toothbrush, can utilize the valve assembly of the present invention to advantage. Examples of such possible uses include dispensing of adhesives or other fluids.

The fluid may be dispensed from the reservoir in various ways (see FIGS. 5 and 11). One possibility is to empty the contents of the reservoir, whatever volume there is. An external command is given to open the valve. The reservoir sensor determines when the reservoir is empty and turns off the valve. A second possibility is to dispense a specified volume of fluid. An external command is given to open the valve. The reservoir sensor checks the fluid level at the start, and is then monitored for an amount of change in the fluid volume in the reservoir. The sensor turns off the flow valve when the proper change in reservoir fluid level has been achieved.

A third possibility is to empty the reservoir at a constant flow rate. An external command is given to open the valve. The reservoir sensor checks the fluid level at the start and at regular intervals of time. This information is used by the control system to measure the flow rate and make any corrections needed to achieve the proper rate. The control valve would not be held open constantly, but would be pulsed open for short periods of time. Changing the pulse duration would allow the flow rate to be increased or decreased as needed. The reservoir sensor determines when the reservoir is empty and turns off the valve.

A fourth possibility is to empty the reservoir over a specified amount of time. An external command is given to open the valve. The reservoir sensor checks the fluid level at the start and the control system determines the flow rate needed to dispense the fluid. The reservoir sensor is checked at regular intervals of time and the information is used to measure the flow rate and make any corrections needed to achieve the proper rate. The control valve would not be held open constantly, but would be pulsed open for short period of time. Changing the pulse duration would allow the flow rate to be increased or decreased as needed. The reservoir sensor determines when the reservoir is empty and turns off the valve.

A fifth possibility is to dispense a specified amount of fluid over a set amount of time. An external command is given to open the valve. The controller determines the flow rate needed. The reservoir sensor checks the fluid level at the start and at regular intervals of time. This information is used by the control system to measure the flow rate and make any corrections needed to achieve the proper rate. The control valve would not be held open constantly, but would be pulsed open for short periods of time. Changing the pulse duration would allow the flow rate to be increased or decreased as needed. The sensor turns off the valve when the proper change in reservoir fluid level has been achieved.

A sixth possibility is to dispense fluid at various flow rates over the entire cycle. This is similar to the third possibility, but the flow rate does not need to be the same throughout the cycle. In this case, a flow rate profile (flow rate at a time or reservoir volume level) is provided to the controller. An external command is given to open the valve. The reservoir sensor checks the fluid level at the start and at regular intervals of time. This information is used by the control system to measure the flow rate, compare it to the flow rate profile and make any changes or corrections needed. The control valve would not be held open constantly, but would be pulsed open for short periods of time. Changing the pulse duration would allow the flow rate to be increased or decreased as needed. The reservoir sensor determines when the reservoir is empty and/or when a specified change in reservoir fluid level has been achieved and turns off the valve.

Figure 6:
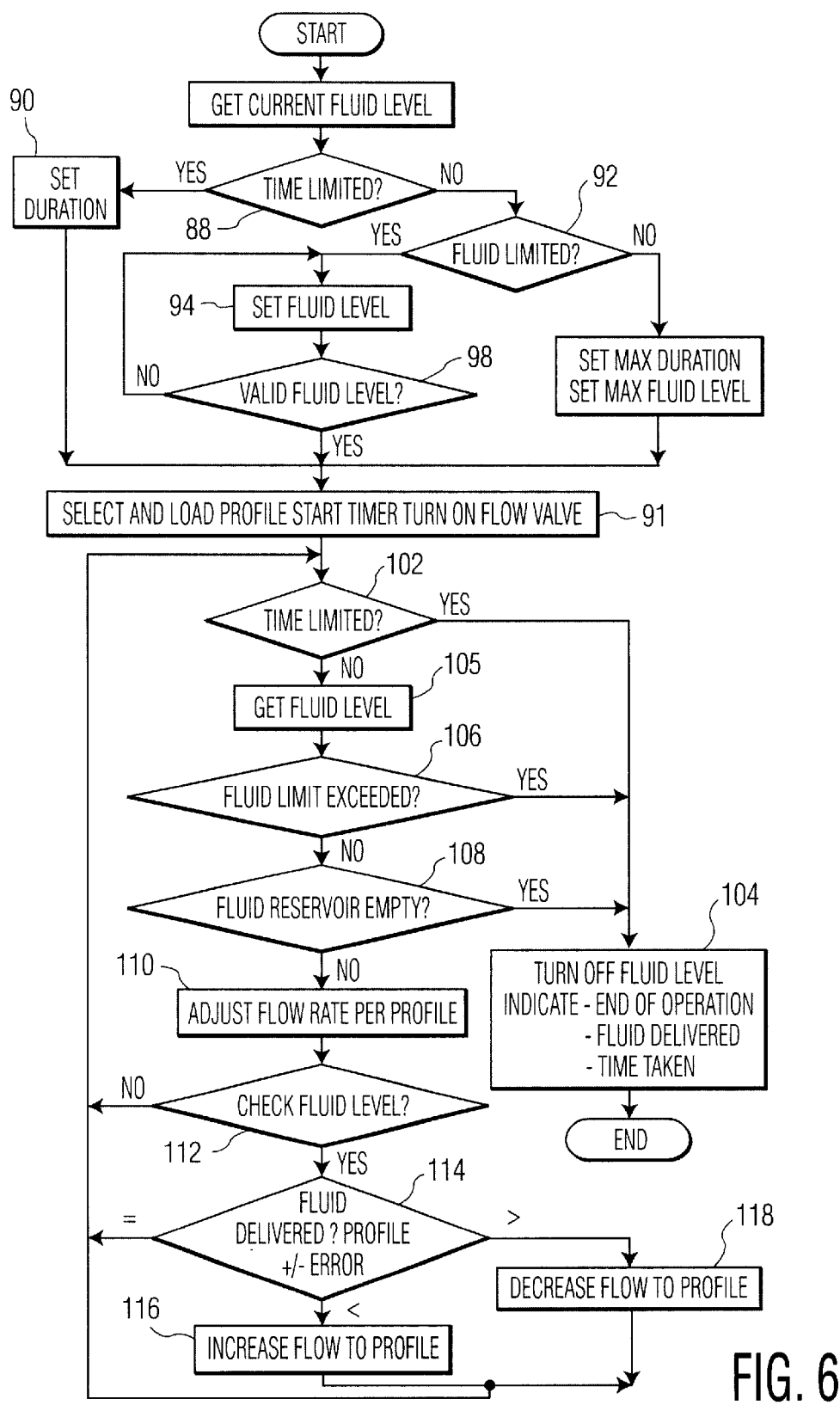
FIG. 6 is a flow chart for a feedback control system for the flow valve/actuator of the present invention.

FIG. 6 shows a feedback control for operation of the fluid valve assembly described above and takes into account the possible fluid dispensing options noted above. In FIG. 6, the first step in the feedback control sequence is to obtain the current fluid level, as shown at block 86. This refers to the fluid level present in the reservoir. A determination is then made at block 88 as to whether the fluid flow (dispensing) through the valve is time-limited or not. If the fluid flow is time-limited, then the time duration is set, at block 90. After the time duration is set, the flow profile is selected and loaded (if a flow profile is to be used), the timer is started and the flow valve is turned on, at block 91.

If the fluid flow is not time-limited, then a determination is made as to whether it is fluid, i.e. volume, limited, as shown at block 92. If the volume of the fluid is limited (predetermined), then the fluid level is set at block 94 and a determination is then made as to whether or not the fluid level is valid, at block 96. If the fluid level is valid, then the routine proceeds to the functions in block 91. If the fluid level determination is not valid, then the program loops back to block 94, for a new fluid level setting. If the fluid level is not limited (block 92), then the maximum fluid level and the maximum duration (time) are set and the program moves to block 91.

As indicated above, the operation of the flow valve begins at block 91. When the flow valve is turned on, a determination is made at successive time intervals, under the looped program, as to whether or not the established time limit has been exceeded, as shown at block 102. If it has, then the fluid level is turned off and an appropriate indication is provided to the user that the time limit has been reached, at indicator block 104. The program then ends and the valve is closed.

If the time limit has not been exceeded, then the fluid level is obtained at block 105, and a determination is made as to whether or not the established fluid volume limit has been exceeded, at block 106. If it has, then the fluid level is turned off and an indication is provided that the fluid has been delivered, at block 104. The program ends and the valve is closed. If the fluid limit has not been exceeded, then a determination is made at block 108 as to whether or not the fluid reservoir is empty. If it is empty, then the fluid valve is closed and an end of operation indication is provided. If the fluid reservoir is not empty, then the flow rate is adjusted, if necessary, in accordance with the preselected profile, at block 110.

After the flow rate has been adjusted in accordance with the preselected profile, a determination is made as to whether or not to check the fluid level, at block 112. If the answer is yes, a determination is made as to whether the fluid being dispersed fits the profile, at block 114. If the fluid delivered matches the profile amount, the program loops back to block 102. If the fluid delivered is less than the profile, a correction is made to increase the flow at block 116 and then the program loops back to block 102. If the fluid delivered is greater than the profile, a correction is made to decrease the flow, at block 118. The program then loops back to block 102. Again, the program overall controls the operation of the flow valve relative to a pre-established load profile.

Accordingly, a new flow valve for a fluid line has been disclosed, as well as a feedback control for its operation. The flow valve itself is particularly useful in applications like a power toothbrush, where there are high standards of reliability and safety. The invention is not limited in its broadest aspect, however, to a power toothbrush application.

The present invention does, however, have several advantages when used in a power toothbrush application. The location of the flow valve relative to the reservoir and refill port as shown in FIG. 11 is important. For all of the valve configurations disclosed, no external force is needed to keep the fluid in the reservoir from flowing through the flow valve. This also prevents the fluid in the reservoir from leaking out of the refill port. All of the configurations, however, allow fluid to flow from the refill port through the valve and into the reservoir without a need to apply any force to the valve body. In order to prevent leaking from the refill port during the fluid dispensing cycle, the valve on the refill port only needs to provide more resistance to fluid flow than that from the normal fluid discharge path.

All of the elements that contain fluid are low cost and are located in a removable portion of the system (the brushhead). The higher cost components (coil, sensor and controller) are located in the toothbrush handle. Having multiple brushheads allows the use of different fluids without the concern of contamination or mixing of the different fluids.

The reservoir sensor and feedback system allows the system to automatically compensate for different viscosity fluids that would flow through the system at different rates. The reservoir sensor could also be used to signal the refilling device when the reservoir is full and/or when a given volume of fluid has reached the reservoir. The sensor could be calibrated by checking it at the start of the refilling process, then again when a known amount of fluid has been put into the system.

While a preferred embodiment has been disclosed for purposes of illustration, it should be understood that various changes, modification and substitutions may be incorporated in the invention without departing from the spirit of the invention, which is defined by the claims as follows:

What is claimed is:

1. A flow valve system for use with a fluid line, comprising:
    a flexible, resilient valve member positioned in a fluid-tight relationship with a fluid line, wherein the valve member has an opening therethrough which is closed when the valve is not actuated and opens when the valve is actuated;
    an actuating element, in the form of a metal member which substantially surrounds the valve member, positioned so that when the valve is to be opened, the actuating element moves so as to deform the valve member, such that when the valve opens, fluid moves through the valve; and
    means, including a coil positioned adjacent the metal member, responsive to an electrical control signal through the coil, for acting on the actuating element to move it to deform the valve member.

2. A system of claim 1, wherein the opening in the valve member is a slit which extends through a portion of the valve member, such that when the slit opens, fluid moves through the valve member.

3. A system of claim 2, wherein the valve member is a duckbill valve.

4. A system of claim 1, wherein the coil is responsive to the electrical control signal to produce a magnetic field which acts on the actuating element to move the actuating element so as to open the valve member.

5. A system of claim 1, wherein the actuating element is a ring-shaped member surrounding the valve.

6. A system of claim 1, wherein the valve member is located within the fluid line.

7. A system of claim 1, wherein the valve member joins two portions of the fluid line.

8. A system of claim 1, including a protrusion which extends outwardly from the valve member at a selected position so that as the actuating element is moved against the protrusion, the valve member opens.

9. A system of claim 1, including a control system for opening and closing the valve member at preselected times, in accordance with preselected criteria.

10. A system of claim 1, wherein the valve member includes a ball element which closes against the opening when the valve is not actuated and moves away from the opening when the valve is actuated.

11. A flow valve system for use with a fluid line, comprising:
    a flexible, resilient valve member positioned in a fluid tight relationship with a fluid line, wherein the valve member has an opening therethrough which is closed when the valve is not actuated and opens when the valve is actuated;
    an actuating element which substantially surrounds the valve member, positioned so that when the valve is to be opened, it moves so as to deform the valve member, such that when the valve opens, fluid moves through the valves; and
    means acting on the actuating element by magnetic action to move it to deform the valve member.

12. An electronic tooth brush having a fluid dispensing capability, comprising:
    an electronic toothbrush having a brushhead, a driving assembly for moving the brushhead in a selected manner, a reservoir for fluid and a fluid line connecting the reservoir with the brushhead;
    a flexible, resilient flow valve member positioned in a fluid-tight relationship in the fluid line, wherein the valve member has an opening therethrough which is closed when the valve is not actuated and opens when the valve is actuated;
    an actuating element in the form of a metal member which substantially surrounds the valve member, positioned so that when the valve is to be opened, it moves so as to deform the valve member, such that when the valve opens, fluid moves through the valve; and
    means, including a coil positioned adjacent the metal member, responsive to an electrical control signal through the coil for, acting on the actuating element to move it to deform the valve member.

13. A system of claim 12, wherein the valve member is a duckbill valve.

14. A fluid refilling and dispensing system for a power toothbrush, comprising:
    a reservoir for fluid within a power toothbrush;
    a fluid line connecting the reservoir with a brushhead portion of the toothbrush;
    a refilling port connected to the fluid line for refilling the reservoir with fluid;
    a flexible, resilient flow valve member positioned in a fluid-tight relationship in the fluid line, wherein the valve member has an opening therethrough and is configured such that fluid under pressure can move through the valve member from the refilling port to the reservoir without the valve member being actuated, but cannot move from the reservoir through the valve and to the brushhead without the valve member being actuated;

an actuating element which substantially surrounds the valve member, positioned so that when fluid is to be dispersed to the brushhead, the actuating element is moved to deform the valve member, opening the valve member to permit fluid to move through the valve member and the fluid line to the brushhead; and means acting on the actuating element be magnetic action to move it to deform the valve member.

* * * * *